350-357 SR
6/24/80 XR 4,209,770

United States Patent [19] [11] 4,209,770
Hamada et al. [45] Jun. 24, 1980

[54] DRIVING TECHNIQUE FOR ELECTROCHROMIC DISPLAYS OF THE SEGMENTED TYPE DRIVING UNCOMMON SEGMENT ELECTRODES ONLY

[75] Inventors: Hiroshi Hamada; Hiroshi Take; Yasuhiko Inami, all of Tenri; Sadatoshi Takechi, Nara; Hisashi Uede, Yamatokoriyama, all of Japan

[73] Assignee: Sharp Kabushiki Kaisha, Osaka, Japan

[21] Appl. No.: 871,040

[22] Filed: Jan. 20, 1978

[30] Foreign Application Priority Data

Jan. 21, 1977 [JP] Japan .................................. 52/5992
Jun. 29, 1977 [JP] Japan ................................ 52/78110

[51] Int. Cl.[2] .......................... G06F 3/14; G09F 9/32
[52] U.S. Cl. .................................. 340/763; 340/785; 340/811; 350/357
[58] Field of Search ............ 340/324 R, 324 M, 336, 340/763, 785, 805, 811; 350/357

[56] References Cited

U.S. PATENT DOCUMENTS

Re. 28,199 10/1974 Deb et al. ........................ 340/324 R
4,060,974 12/1977 Natori et al. ......................... 340/336
4,060,975 12/1977 Yamaguchi ......................... 340/336

*Primary Examiner*—Marshall M. Curtis
*Attorney, Agent, or Firm*—Birch, Stewart, Kolasch & Birch

[57] ABSTRACT

A driving technique is provided for an electro-optical display which includes an electrochromic material and a predetermined number of display electrodes, different combinations of the display electrodes defining different desired display patterns. The electrochromic phenomenon is developed within the electro-optical display upon a flow of current supplied through the display electrodes. In transition of a visual display from a specific display pattern to another, voltages are applied to only the one or more display electrodes which are not common to the two display patterns, while no voltages are applied to the one or more display electrodes common to the two display patterns. Applications of a coloration voltage to particular one or more display electrodes and a bleaching voltage to different one or more display electrodes in transition of a visual display are initiated at a same time to reduce the time period required to transcend from one visual display to another.

8 Claims, 12 Drawing Figures

FIG. 1
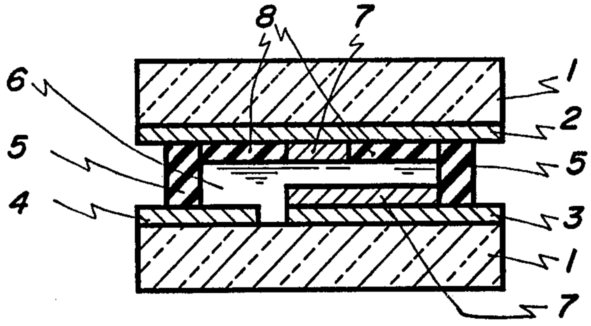
FIG. 2
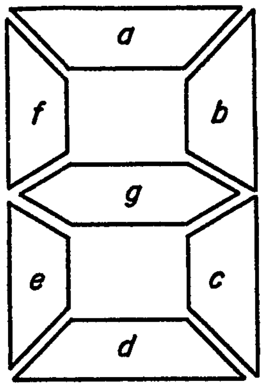
FIG. 3 (A)
FIG. 3 (B)
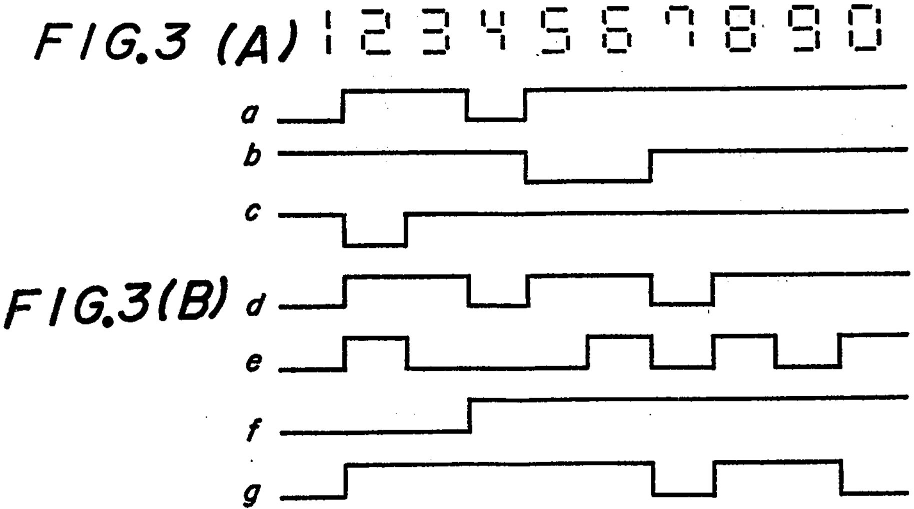

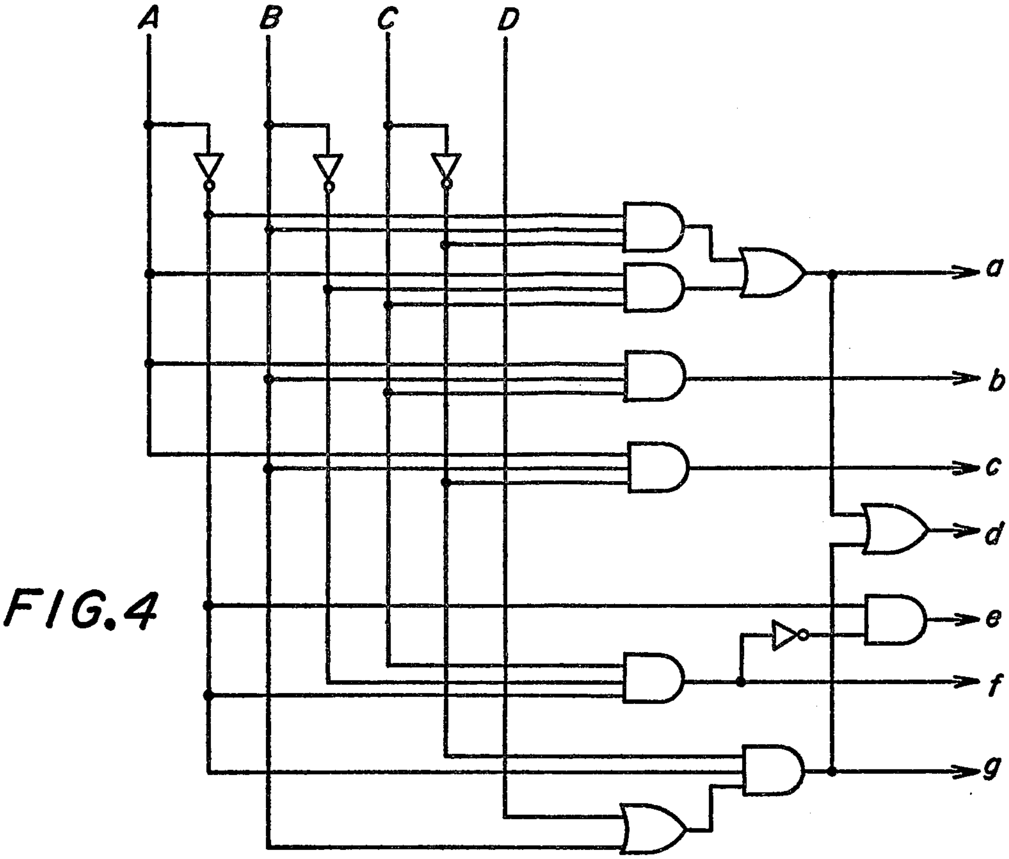
FIG.4
FIG.5 (A)
FIG.5 (B)
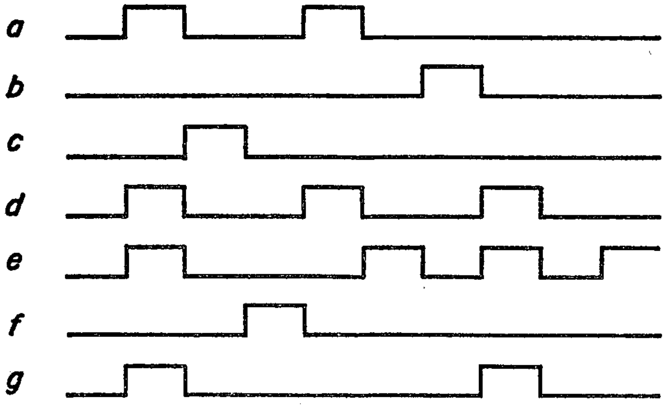

DRIVING TECHNIQUE FOR ELECTROCHROMIC DISPLAYS OF THE SEGMENTED TYPE DRIVING UNCOMMON SEGMENT ELECTRODES ONLY

BACKGROUND OF THE INVENTION

The present invention relates to a driving method for an electro-optical display containing an electrochromic material held in two electrode carrying support plates to manifest reversible variations in the light absorption properties when current is supplied.

More specifically, the present invention relates to a modified driving method of a constant voltage type for an electrochromic display device, which shows minimum power dissipation and rapid response.

Generally, there are three types of electrochromic displays (ECD).

The first type of ECD utilizes an electrically-induced chemical reduction of a colorless liquid to produce a colored, insoluble film on a cathode surface. A typical colorless liquid suited for the first type of ECD is an aqueous solution of the conducting salt, KBr and an electrochromic material, viologen, which produces a purplish film upon electrochemical reduction. See, for example, C. J. Shoot et al, Appl. Phys. Lett. 23 64 (1973).

When a display electrode is held at a potential lower than a predetermined level (a threshold level), the following reaction is conducted to produce a purplish film on the display electrode.

$$\underset{\text{(transparent)}}{A^{2+}} + e^- \rightleftharpoons \dot{A}^+$$

$$\dot{A}^+ + X^- \rightleftharpoons \underset{\text{(purplish)}}{\dot{A}X\downarrow}$$

where:

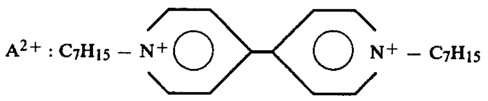

$X^-$ : $Br^-$, $Cl^-$

The colored condition is maintained for several hours through several days after the above-mentioned potential is removed as long as the display electrode is electrically separated from the driver circuit (memory effects). Conversely, when the colored display electrode is held at a potential higher than the threshold level, the reaction is conducted inversely so that the colored film is oxidized to be dissolved into a transparent electrochromic material solution.

In the second type of ECD, the color variation is produced by the change in the absorbance of an inorganic solid film formed on electrodes. The inorganic film used in the second type of ECD is the film of the transition metal oxide material such as tungsten oxide ($WO_3$). Such a film cooperates with an electrolyte. A typical system of the second type ECD is disclosed in B. W. Faughnan et al, RCA Review 36 177 (1975).

The coloration operation in the second type of ECD is caused by injection of protons from the electrolyte and injection of electrons from the electrode. The injection of protons and electrons creates tungsten bronze. The coloration operation is as follows:

$$\underset{\text{(transparent)}}{WO_3 + xH^+ + xe^-} \rightleftharpoons \underset{\text{(blue)}}{H_x^+WO_3e_x^-}$$

When the display electrode is held negative, the coloration is conducted. And when the display electrode is held positive, the bleaching is conducted. The memory effect is also expected as the first type of ECD.

An example of the ECD of the second type is described in copending application, ELECTROCHROMIC DISPLAY, Ser. No. 773,774, filed Mar. 2, 1977 by Kozo Yano and Hisashi Uede and assigned to the same assignee as the present application.

The third type of ECD employs the EC material similar to that employed in the second type and a solid state electrolytic film through which ions can travel but electrons can not travel. An example of the third type of ECD was disclosed in U.S. Pat. No. 3,521,941 entitled "ELECTRO-OPTICAL DEVICE HAVING VARIABLE OPTICAL DENSITY" on July 28, 1970.

The above-mentioned ECD has the following characteristic features, in general:

(1) low voltage drive (below several volts)
(2) memory effects are expected, which maintains the colored state for several hours through several days after the applied voltage is removed
(3) low energy consumption (for a single cycle of coloration/bleaching the energy consumption is several through several tens mj/cm$^2$
(4) the degree of the coloration is determined by the charge amount flowing therethrough
(5) contrast is very high and is independent of the viewing angle
(6) high visibility is expected even when the ambience is bright, because ECD is a passive display
(7) display surface is flat and display pattern configurations can be arbitrarily selected
(8) driver circuit can be implemented with semiconductor elements Generally, there are three types of driving methods for ECD. That is, the ECD is driven in a method either one of the constant potential type, the constant current type, and the constant voltage type.

In the constant potential type, a reference electrode is provided for maintaining a display electrode potential at a predetermined value. The display quality is very high, but a driver circuit becomes complicated and the power supply voltage is not effectively used.

In the constant current type, current flowing through a unit area is held at a fixed value. The coloration degree can be controlled to a desired value. However, a driver circuit is not suited for mass production, since the constant current value must be set by taking acccout of display sizes of respective segment electrodes employed in the ECD. Moreover, the power supply voltage is not effectively used, because the transistors employed in the driver circuit of the constant current type must operate in the active region.

Examples of the driver circuits of the constant potential type and the constant current type are described in copending application, CONSTANT CURRENT SUPPLY DRIVER FOR ELECTROCHROMIC DISPLAYS OF THE SEGMENTED TYPE, Ser. No. 800,008 filed May 24, 1977 by Yasuhiko Inami, Tadanori Hishida, Kozo Yano, Hiroshi Hamada, and Hiroshi Nakauchi and assigned to the same assignee as the present application.

In the constant voltage type, a constant voltage is applied across a display electrode and a counter electrode for a predetermined time period. The driver circuit can be simplified, and the power supply voltage is effectively used since the transistors employed in the driver circuit of the constant voltage type operate in the saturated region. However, the following characteristics are required to obtain high visibility.

(1) The potential of the counter electrode must be stable even when the number of display electrodes in the coloration state varies.

(2) The over potential due to the reaction at the counter electrode must be held small.

(3) The resistance value of the lead electrode connected to the display (or segment) electrode must be small and inversely proportional to the size of the corresponding display electrode.

The present inventors have developed an ECD cell which fulfills the above requirements. Therefore, the present invention relates to a modification of the drive method for ECD of the constant voltage type.

Since the ECD has the memory effects and the coloration degree is dependent on the current amount flowing through the display electrode, the application of the coloration voltage must be controlled not to be superimposed to obtain a uniform display. There have been proposed the following two methods for precluding the superimposed application of the coloration voltage.

[A] Upon every change of the display information, every display electrode is once placed into the bleached condition. Thereafter, the coloration operation is conducted to selected display electrodes. This method consumes large energy. Moreover, a time period of ($\tau_W+\tau_E$) is required to complete the change of the display information when time periods of $\tau_W$ and $\tau_E$ are required for completing the coloration operation and the bleaching operation, repsectively.

[B] The coloration voltage or the bleaching voltage is applied to only the one or more display electrodes which are not common to the two display patterns in the transition of a visual display from a specific display pattern to another. No voltage is applied to the one or more display electrodes common to the two display patterns. The energy consumption is greatly reduced. A typical driver circuit for conducting this method is described in copending application, DRIVING TECHNIQUE FOR ELECTROCHROMIC DISPLAYS OF THE SEGMENTED TYPE, Ser. No. 751,819, filed Dec. 17, 1976 by Hisashi Uede, Yasuhiko Inami, Hiroshi Hamada, Tadanori Hishida and Hiroshi Nakauchi and assigned to the same assignee as the present application.

OBJECTS AND SUMMARY OF THE INVENTION

Accordingly, an object of the present invention is to improve a driving method of the constant voltage type for an electrochromic display.

Another object of the present invention is to provide a driving method for electrochromic displays which is capable of minimizing energy consumption and enhancing legibility of a visual display provided by the electrochromic displays.

Still another object of the present invention is to minimize a time period required in transition of a visual display from a specific display pattern to another.

Yet another object of the present invention is to provide a driver circuit for electrochromic displays which is implemented only with digitally controlled circuits.

A further object of the present invention is to provide an electrochromic display cell which can tolerate the high speed drive, for example, 500 msec.

Other objects and further scope of applicability of the present invention will become apparent from the detailed description given hereinafter. It should be understood, however, that the detailed description and specific examples, while indicating preferred embodiments of the invention, are given by way of illustration only, since various changes and modifications within the spirit and scope of the invention will become apparent to those skilled in the art from this detailed description.

The drive system of the present invention comprises the combination of the drive method of the constant voltage type and the partial erasing method wherein the coloration voltage or the bleaching voltage is applied to only the one or more display electrodes having display patterns which are not common to or are not the same as the two display patterns (previous and subsequent display patterns) in transition of a visual display from a specific display pattern to another. That is, the present invention involves combining the constant voltage type drive method with the partial erasing method such as described in copending application, DRIVING TECHNIQUE FOR ELECTROCHROMIC DISPLAYS OF THE SEGMENTED TYPE, Ser. No. 751,819, filed Dec. 17, 1976 by Hisashi Uede, Yasuhiko Inami, Hiroshi Hamada, Tadanori Hishida and Hiroshi Nakauchi and assigned to the same assignee as the present application.

More specifically, a counter electrode of the electrochromic display cell is maintained at the ground potential. The display electrode which should be changed from the bleached state to the coloration state is connected to a negative constant voltage source for a predetermined time period, and the display electrode which should be changed from the coloration state to the bleached state is connected to a positive constant voltage source for another predetermined time period. The above-mentioned coloration operation and the bleaching operation are conducted at a same time, or, initiated at a same time to minimize a time period required in transition of a visual display from a specific display to another.

In a preferred form, a time period during which the bleaching voltage is applied to is selected longer than the time period during which the coloration voltage is applied to. By this method, complete bleaching is ensured and a stable display is ensured. A typical drive system for achieving the above method is described in copending application, METHOD OF DRIVING ELECTROCHROMIC DISPLAY DEVICE AND ELECTROCHROMIC DISPLAY DEVICE THEREFOR, Ser. No. 833,653, filed Sept. 15, 1977 by Hasashi Uede, Kozo Yano, Hiroshi Hamada, Hiroshi Nakauchi and Yasuhiko Inami and assigned to the same assignee as the present application.

In another preferred form, a refresh method is employed to enhance the visibility. Examples of the refresh method are described in copending application, DRIVING TECHNIQUE FOR ELECTROCHROMIC DISPLAYS OF THE SEGMENTED TYPE, Ser. No. 751,819, filed Dec. 17, 1976 by Hasashi Uede, Yasuhiko Inami, Hiroshi Hamada, Tadanori Hishida and Hiroshi Nakauchi and assigned to the same assignee as the present application, and also in copending application, RE- GENERATION OF A MEMORY STATE IN ELECTROCHROMIC DISPLAYS, Ser. No. 817,540, filed July 20, 1977 by Hisashi Uede, Yasuhiko Inami, Hiroshi Kuwagaki, Hiroshi Hamada, Tadanori Hishida and Hiroshi Nakauchi and assigned to the same assignee as the present application.

BRIEF DESCRIPTION OF THE DRAWINGS

The present invention will become more fully understood from the detailed description given hereinbelow and the accompanying drawings which are given by way of illustration only, and thus are not limitative of the present invention and wherein, FIG. 1 is a cross-sectional view of a basic structure of an electrochromic display device suited for the driving technique of the present invention;

FIG. 2 is a layout of a typical seven-segment numeral display pattern;

FIG. 3(A) is a schematic view showing display conditions of numerals 1 through 0;

FIG. 3(B) is a time chart of selection signals applied to segment electrodes;

FIG. 4 is a circuit diagram of a decoder circuit employed in the driving technique of the present invention;

FIG. 5(A) is a schematic view showing the display conditions of numerals 1 through 0;

FIG. 5(B) is a time chart showing output signal derived from the decoder circuit of FIG. 4;

DESCRIPTION OF THE PREFERRED EMBODIMENTS

Figure 6:
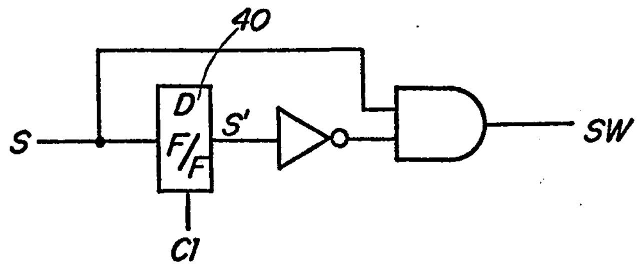
FIG. 6 is a circuit diagram of a determination circuit comprising a data flip-flop for determining segments which should receive the coloration voltage.

FIG. 1 shows an electrochromic display device suited for the driving technique of the present invention.

A transparent display electrode 2 is formed on a transparent glass substrate 1 through the use of electron beam evaporation techniques. The transport display electrode is made of $In_2O_3$, has a thickness of 2000Å, and has a sheet resistance value of 20Ω/sq. A $WO_3$ film 7 is formed on the display electrode 2 as electrochromic material through the use of vacuum evaporation techniques. The formation of the $WO_3$ film 7 is conducted under the conditions of the substrate temperature 350° C., the evaporation rate 10 Å/sec., and the pressure $5\times10^{-4}$ Torr ($O_2$ partial pressure). The $WO_3$ film 7 is formed only on the display section through the use of a metal mask and has a thickness of 5000 Å. Thereafter, the display electrode 2 is shaped in a desired configuration throught the use of photo-etching techniques employing the etchants comprising $FeCl_3$ and HCl. Lead electrode portions of the display electrode 2 are coated with an insulator film 8 through the use of vacuum evaporation techniques. The insulator film 8 is preferably a SiO film of 5000 Å thick. The thus formed substrate is a front substrate of the electrochromic display cell.

A counter electrode 3 and a reference electrode 4 are formed on another transparent glass substrate 1 through the use of vacuum evaporation techniques. The electrodes 3 and 4 are made of Ni, have a thickness of 2000 Å, and a sheet resistance value of 2Ω/sq. The reference electrode 4 is required for determining whether the segment is colored or not for performing the partial erasing method. A $WO_3$ film 7 is formed on the counter electrode 3 in a same manner as the $WO_3$ film 7 is formed on the display electrode 2.

The thus formed two substrates are fixed to each other with intervention of spacers 5 made of glass bars of 1 mm square. A white porous ceramic plate is preferably disposed within the electrochromic display cell to provide a white background. An electrolyte 6 is filled within the electrochromic display cell. The electrolyte 6 comprises γ-Butyrolactone mixed with $LiClO_4$ by 1.0 mol/l.

Now assume that the ECD is used to display the numeral information through the use of seven segments as shown in FIG. 2.

The partical erasing method will be described with reference to a condition where the display pattern is changed from "2" to "3". Segments a, b, d, e and g are in the coloration states when the information "2" is displayed. Segments a, b, c, d and g must be placed in the coloration states to display the information "3". Accordingly, the segment e must be bleached and the segment c must be colored to change the display information from "2" to "3". The remaining segments will not changed their states even when the display information is changed from "2" to "3".

The above-mentioned partical erasing technique is described in copending application, DRIVING TECHNIQUE FOR ELECTROCHROMIC DISPLAYS OF THE SEGMENTED TYPE, Ser. No. 751,819, filed Dec. 17, 1976 by Hisashi Uede, Yasuhiko Inami, Hiroshi Hamada, Tadanori Hishida and Hiroshi Nakauchi and assigned to the same assignee as the present application, wherein a data flip-flop is provided for determining whether the segment is previously placed in the coloration state. FIG. 6 shows an example of the determination circuit employing a data flip-flop 40.

Figure 7:
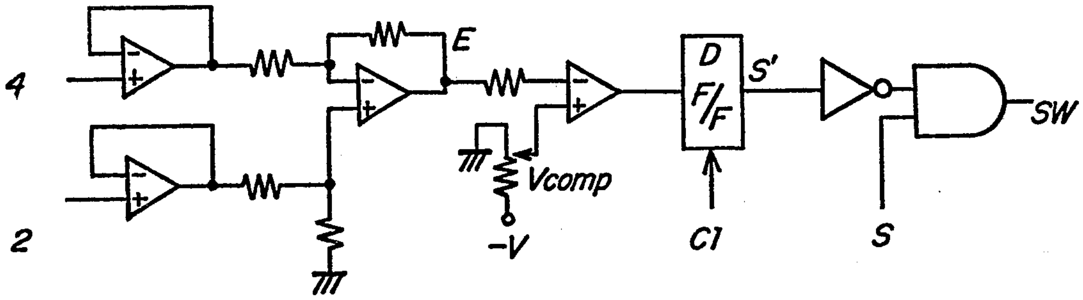
FIG. 7 is a circuit diagram of a determination circuit responsive to the segment potential for determining segments which should receive the coloration voltage.

In another method for performing the partial erasing technique, the potential of the respective segments is detected to determine whether the segment is previously placed in the coloration state. A typical circuit for conducting the above method is described in copending application, ELECTRIC MEMORY DETECTOR IN AN ECD DRIVER, (23-354P, 450-US), filed Dec. 12, 1977 by Hiroshi Nakauchi, Katubumi Koyanagi, Hiroaki Kato, Yutaka Takafuji, Yasuhiko Inami and Hisashi Uede and assigned to the same assignee as the present application. FIG. 7 shows an example of the determination circuit which is responsive to the detected potential of the respective segments. In FIG. 7, a terminal 4 is connected to the reference electrode, and another terminal 2 is connected to a segment electrode.

When the ECD is employed in a timepiece or a counter, the order of the change of the display pattern is fixed. In this case, a particular decoder as shown in FIG. 4 can effectively conduct the partial erasing technique. The decoder of FIG. 4 develops a signal "1" at the respective output terminals a through g only when the corresponding segments should be changed from the bleached state to the coloration state while the display information is progressively increased from zero (0). FIGS. 5(A) and 5(B) specifically show the output signals of the decoder of FIG. 4.

Figure 8:
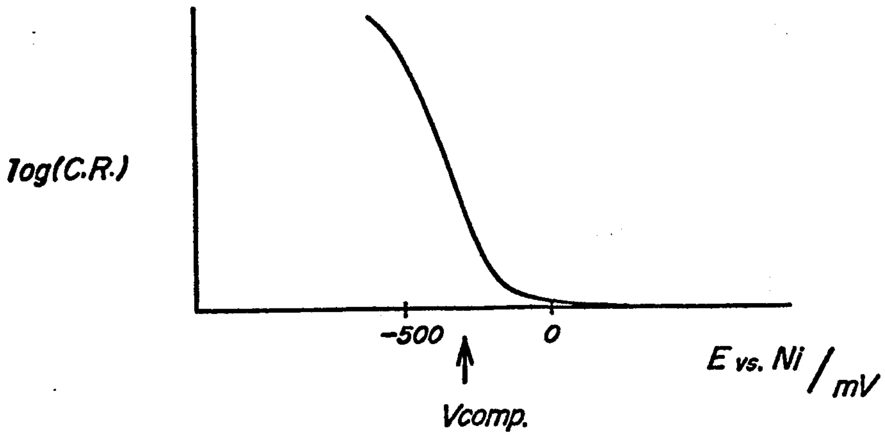
FIG. 8 is a graph showing contrast versus equilibrium potential characteristics of an electrochromic display device.

Refer again to the determination circuit of FIG. 7, which is responsive to the detection output of the potential of the respective segments. FIG. 8 shows variations of the constant ratio of the segment in a fashion depending on the segment potential as compared with the potential of the reference electrode made of nickel.

Although the contrast ratio is dependent on the film thickness of the electrochromic material and the wave-length of the detection beam, when the detection is conducted through the use of the electrochromic display cell of FIG. 1 and the detection beam of 590 nm wave-length, the contrast ratio is about 10:1 in the case where the segment potential is −500 mV. The Vcomp should be set at a value corresponding to a preferred contrast ratio. In this example, the Vcomp is held at about −0.4 through −0.2 volts. When the coloration is less than the Vcomp, the segment is considered to be placed in the bleached state and, therefore, the coloration operation is conducted to the segment.

The determination circuits of FIGS. 4, 6 and 7 develop the coloration signal SW which takes the logic value "1" only when the corresponding segment should be changed from the bleached state to the coloration state. More specifically, the coloration signal SW can be expressed as follows:

$$SW=\overline{S'}.S$$

where:

S′ represents the previous display state. (the coloration state is "1", and the bleached state is "0")

S represents the updated display state.

The control signal S is derived from the conventional decoder which decodes the BCD signals to segment selection signals for the seven-segment layout. FIGS. 3(A) and 3(B) show the segment selection signals corresponding to the respective display patterns.

In the foregoing description, only the coloration signal is considered. The bleaching signal can be developed in a same manner as to provide the coloration signal. For example, the bleaching signal can be developed through the use of the logic $SE=S'.\overline{S}$. Alternatively, the bleaching signal SE can be $\overline{S}$, since the bleaching voltage can be superimposed without creating any disadvantages.

The thus developed coloration and bleaching signals SW and SE are combined with pulses S and E to control semiconductor switches associated with the respective segments. The pulse W determines a time period $\tau_W$ during which the coloration operation is conducted, and the pulse E determines a time period $\tau_E$ during which the bleaching operation is conducted.

The pulses W and E can be derived from the frequency divider in the case where the ECD is employed in the electronic timepiece. Alternatively, a one-shot multivibrator can be employed to develop the pulses W and E.

When a refresh pulse R is developed, the entire segments should be once placed into the bleached state and, then, the coloration operation should be conducted to desired segments. Therefore, the pulse E must be appear earlier than the pulse W. Accordingly, the semiconductor switch for applying the coloration voltage is closed by the logic of (SW+R.S).W. And the semiconductor switch for applying the bleaching voltage is closed by the logic of (SE+R).E. Alternatively, the semiconductor switch for applying the bleaching voltage is closed by the logic of S+R.E in case where the bleaching operation is conducted to the entire segments which are not selected.

Figure 9:
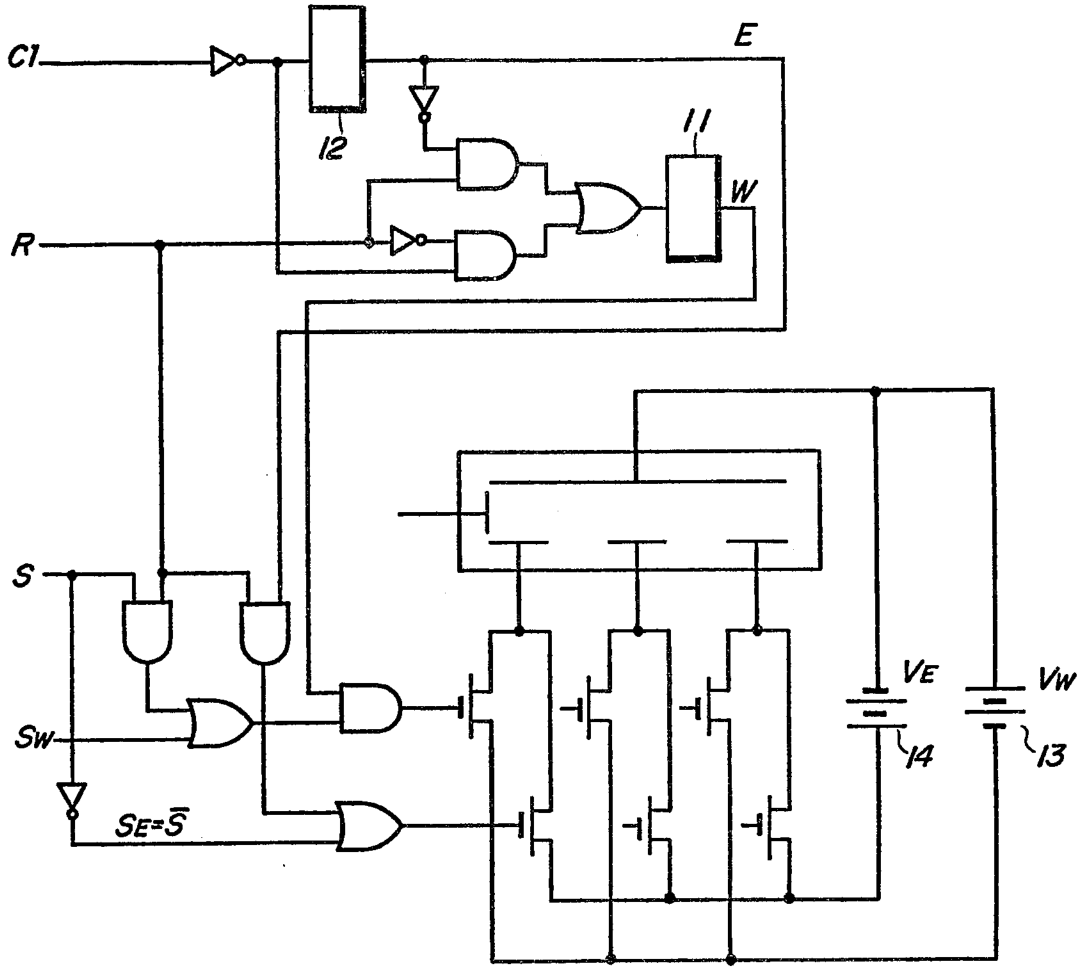
FIG. 9 is a circuit diagram of an embodiment of a driver circuit of the present invention.

FIG. 9 shows an embodiment of a driver circuit of the present invention. In this embodiment, the semiconductor switch for applying the bleaching voltage is responsive to the logic of $\overline{S}$+R.E.

The driver circuit of FIG. 9 mainly comprises one-shot multivibrators 11 and 12 for developing the above-mentioned pulses W and E. A negative constant voltage source 13 is provided for generating the coloration voltage, and a positive constant voltage source 14 is provided for generating the bleaching voltage.

Figure 10:
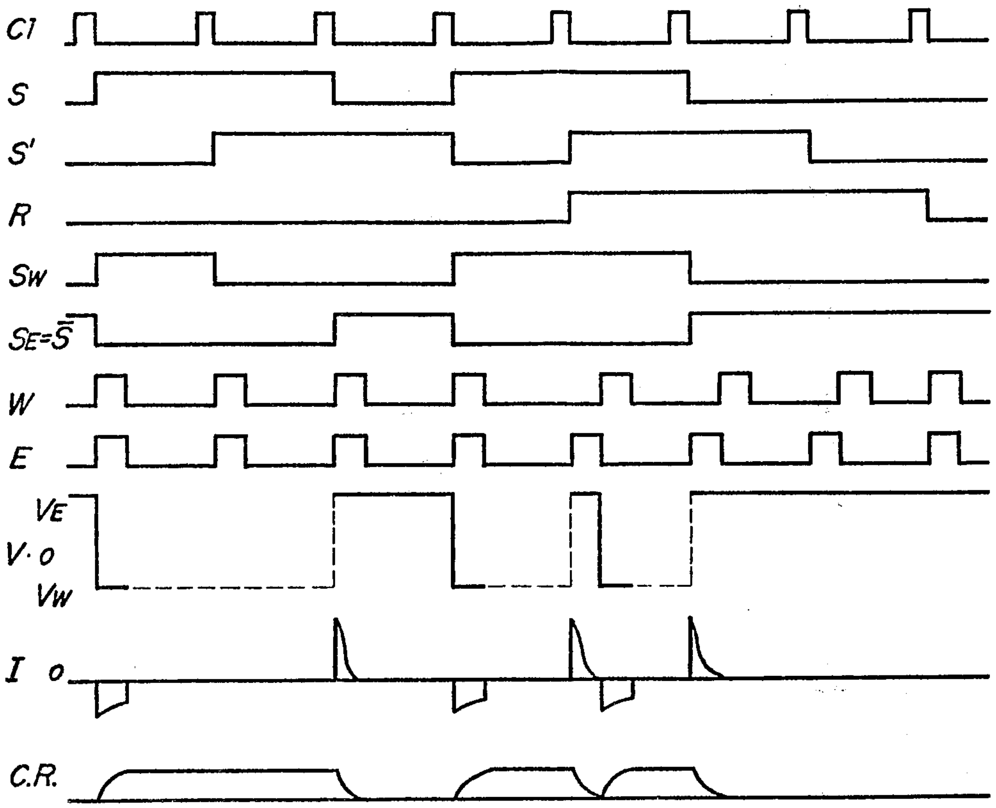
FIG. 10 is a time chart showing various signals occurring within the driver circuit of FIG. 9.

FIG. 10 shows various signals occurring within the driver circuit of FIG. 9.

V represents a voltage signal applied to the segment electrode (or display electrode). In the waveform of V, the broken line portion represents a state where the system is held in the high impedance condition. I represents the current flowing through the display electrode. The positive current represents the bleaching operation. C.R. represents the contrast ratio. The refresh pulse R can be developed by either the manual operation or utilizing the frequency divider employed in the electronic timepiece. The refresh pulse R must be synchronized with clock pulses C1 to preclude the situations where the refresh pulse R starts at a time when the pulse W or E is developed, or the refresh pulse R terminates at a time when the pulse W or E is developed.

The driver circuit of FIG. 9 is connected to the electrochromic display cell of FIG. 1. A preferred driving condition is as follows:

The coloration voltage pulse has a voltage level of about 0.5 V and has a pulse-width of 500 msec. The bleaching voltage pulse has a voltage level of about 2.0 through 2.5 V and has a pulse-width of 1 sec. The actual bleaching period is about 200 msec. The charge amount flowing during the coloration operation is above 5 $mC/cm^2$, and the contrast ratio of the colored condition is above 3:1 (detected by the 590 nm wave-length beam). The bleaching operation is completely conducted. The colored state is maintained for more than 24 hours at room temperature. The reliability is under experimentation wherein the system can operate effectively when the change of the display information is conducted at every two seconds for more than $10^6$ times.

The invention being thus described, it will be obvious that the same may be varied in many ways. Such variations are not to be regarded as a departure from the spirit and scope of the invention, and all such modifications are intended to be included within the scope of the following claims.

What is claimed is:

1. A drive system for driving a electrochromic display cell to change the display pattern of said electrochromic display from a first display pattern to a second display pattern, said electrochromic display cell including an electrochromic material, a counter electrode and a predetermined number of display electrodes, different combinations of said display electrodes defining different desired display patterns, said drive system comprising:

a positive constant voltage source;

first switching means for connecting the positive terminal of said positive constant voltage source to selected ones of a first set of display electrodes to bleach said first set of display electrodes;

a negative constant voltage source; and second switching means for connecting said negative constant voltage source to other selected ones of a second set of display electrodes to color said second set of display electrodes;

said first switching means switching to bleach said selected ones of said first set of display electrodes which are members of said first display pattern but not members of said second display pattern;

said second switching means switching to color said other selected ones of said second set of display electrodes which are not members of the first display pattern but are members of the second display pattern;

said first and second switching means maintaining unenergized the remaining ones of said display electrodes which are members of both said first and said second display pattern; and means for controlling the switching of said first and said second switching means to color said other selected ones of said second set of display electrodes and to bleach said selected ones of said first set of display electrodes simultaneously, said first switching means switching to bleach said selected ones of said first set of display electrodes for a time period longer than a time period during which said second switching means switches to color said other selected ones of said second set of display electrodes.

2. The drive system of claim 1, wherein said counter electrode and one terminal of each of the constant voltage sources is maintained at the ground potential whereby the power consumption of said electrochromic display cell is reduced.

3. The drive system of claim 2, wherein said positive constant voltage source develops an output voltage having an absolute value which is higher than the absolute value of the output voltage of said negative constant voltage source.

4. A drive system in accordance with claim 1 wherein said second switching means switches to terminate the coloration of said second set of display electrodes prior to the switching to terminate the bleaching of said first set of display electrodes by said first switching means.

5. A drive system in accordance with claim 1, wherein the display pattern of said electrochromic display is changed in a predetermined order; and wherein said drive system further comprises decoder circuit means having input terminals connected to receive display information indicative of said second display pattern and having output terminals for developing segment control signals for changing the display pattern of said selected ones of said display electrodes in said predetermined order to indicate said second display pattern in response to receipt of said display information indicative of said second display pattern.

6. A drive system in accordance with claim 4, wherein said first switching means connects the positive terminal of said positive constant voltage source to said first set and said second set of display electrodes to bleach said first set and said second set of display electrodes; and wherein said second switching means connects said negative constant voltage source to said other selected ones of said second set of display electrodes to color said second set of display electrodes in response to the completion of the bleaching of said first and second set of display electrodes by said first switching means.

7. A drive system in accordance with claim 1, wherein said first switching means switches to bleach the remaining ones of said first and second set of display electrodes which are not selected for coloration by said second switching means.

8. A driving method for driving an electrochromic display cell which includes an electrochromic material and a predetermined number of display electrodes, different combinations of energized display electrodes defining different desired display patterns, whereby, in transition of a visual display from a previous display pattern to a subsequent display pattern, said driving method comprises the steps of:

simultaneously supplying a coloration voltage potential and a bleaching voltage potential to all of said display electrodes which are not common to both said previous display pattern and said subsequent display pattern to thereby selectively color or bleach the display patterns in the areas to which said voltage potential is applied;

maintaining the energization state of all display electrodes which are common to both said previous display pattern and said subsequent display pattern; and supplying said bleaching voltage potential to selected ones of said all of said display electrodes which are not common to both said previously display pattern and said subsequent display pattern for a time period longer than the time period during which said coloration voltage potential is supplied to other selected ones of said all of said display electrodes which are not common to both said previous display pattern and said subsequent display pattern.

* * * * *